United States Patent [19]

Page

[11] Patent Number: 5,179,290
[45] Date of Patent: Jan. 12, 1993

[54] SYSTEM OF MAINTAINING CLEAN ELECTRICAL CONTACTS

[75] Inventor: Stephen L. Page, Greene, N.Y.
[73] Assignee: Raymond Corporation, Greene, N.Y.
[21] Appl. No.: 628,126
[22] Filed: Dec. 17, 1990
[51] Int. Cl.⁵ ............................................. H01H 1/60
[52] U.S. Cl. ................................................. 307/137
[58] Field of Search .............. 200/308, 334; 307/116, 307/125, 130, 134, 137; 314/23, 24; 340/635, 644, 653, 660; 361/2, 3, 6, 135

[56] References Cited
U.S. PATENT DOCUMENTS 2,701,965 2/1955 Sherman ................................. 73/359
3,029,351 4/1962 Akmenkalns ........................... 307/2
4,780,786 10/1988 Weynachter et al. ................. 361/87

Primary Examiner—A. D. Pellinen
Assistant Examiner—Michael A. Friedhofer
Attorney, Agent, or Firm—Salzman & Levy

[57] ABSTRACT

A method is described for maintaining silver cadmium oxide alloy tips of an electrical contactor clean and substantially free of contamination involving operating the electrical contactor normally, under its regular working operation, in a cold switching mode, and at intervals of time, separating the tips under a load condition. A procedure is described also for determining at what interval the tips should be separated under the load condition. Apparatus is described that will operate to perform this method automatically.

35 Claims, 4 Drawing Sheets

SYSTEM OF MAINTAINING CLEAN ELECTRICAL CONTACTS

BACKGROUND OF THE INVENTION

1. Field of the Invention

The present invention, generally, relates to the servicing of electrical contacts and, more particularly, to a method and apparatus of maintaining electrical contacts clean.

An ideal situation would involve having two sets of electrical contacts for use in a high current application, one set formed of solid silver for use only when there is to be no flow of electrical current during a separation of the contacts and a second set formed of silver cadmium for use when switching is to interrupt a current flow. Such an arrangement has several disadvantages, such as stocking two sets of electrical contacts for each piece of equipment, the resulting confusion when they are mixed up and the excessive cost involved.

2. Description of the Prior Art

Efforts in the past have approached this problem from different viewpoints. One is to provide a mechanical structure that, hopefully, would wipe the contacts to maintain them clean from contamination and another is to provide a structure to eliminate electrical arcing during contact separation in an effort to avoid a major cause of contamination.

U.S. Pat. No. 4,286,311 to Maglica describes a switch arrangement in which one switch contact is rotated each time it is actuated to wipe off dirt and products of oxidation and corrosion between the contacts. Elastomeric seals are constructed between the parts that are separable and movable to seal them hermetically against moisture and dirt.

U.S. Pat. No. 4,616,203 to Kakizoe et al. describes an electromagnetic contactor with particular structurally arranged parts that define an electrical arc-extinguishing chamber to prevent damage and contamination even when the interruption of a large electrical current is carried out repeatedly.

U.S. Pat. No. 4,743,720 to Takeuchi et al. describes the connection of an electromagnetic winding for being energized by the same electrical current that develops an arc between contacts being separated. This electromagnetic winding is located so that the lines of magnetic force that it develops extend transversely of the arc, resulting in extending its length and quickly extinguishing the arc. An electrical circuit includes the electromagnetic winding and a form of magnetic flux diverting yoke.

The prior art describes a number of mechanical structures for maintaining the effectiveness of electrical contacts. One system which occurs most frequently for assuring switch safety provides double contact springs with the contacts arranged in parallel. However, since these contacts are always touching, the cleaning involved, if any, is negligible.

Therefore, the problem persists, and efforts to solve it have concentrated on ways to avoid developing contamination of electrical contacts, such as structures that try to extinguish all arcing between electrical contacts. It has not been until the present invention that a way has been found to use the electrical arc itself to solve the problem of contaminated contacts.

OBJECTS AND SUMMARY OF THE INVENTION

It is a principal object of the invention to provide a method of utilizing the natural tendency of arc development between contacts as they separate to interrupt an electrical current flow, in such a way that the contacts are maintained in a clean condition.

It is also an important object of the present invention to provide apparatus for utilizing the method of the invention.

Another object of the invention is to provide apparatus to permit the automatic operation of the method of the invention.

Briefly, the method of the invention involves the use of a contactor with silver cadmium oxide alloy tips operated in a cold switching mode as the customary routine. However, at a predetermined interval, this contactor is operated while an electrical current is flowing through the contactor tips. In one aspect of the invention, the predetermined interval is determined automatically by monitoring a voltage across the tips, and when this voltage reaches a predetermined value, the tips are separated under a load condition. The resulting electrical arc cleans the tips, and when the method of the present invention is utilized as a regular practice, the tips of the contactor are maintained clean and substantially free of oxides and other contaminations.

The above, other and further objects, advantages and features of the invention will become more readily apparent in view of the following detailed description when taken in conjunction with the accompanying drawings.

DETAILED DESCRIPTION OF THE INVENTION

Figure 1:
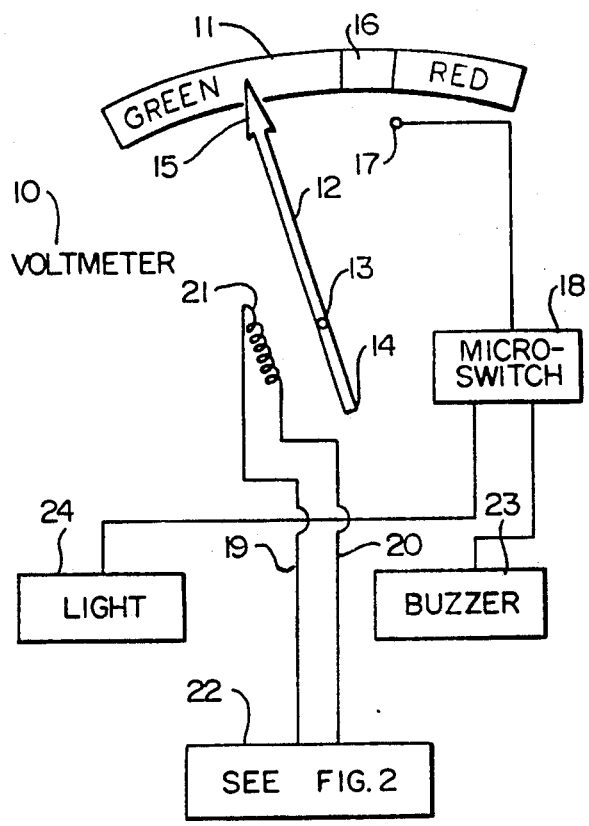
FIG. 1 is a circuit diagram illustrating component parts in a connection to give a ready indication of the level of tip contamination.

Referring to FIG. 1 of the drawings, a voltmeter is identified generally by the numeral 10. The voltmeter 10 has a scale 11 which by the upper "red" end indicates a voltage value that requires a cleaning of the contactor tips. In contrast, a lower "green" end of the scale 11 indicates that the contactor tips are clean and in satisfactory operating order.

A visual indication is given by the voltmeter 10 by means of a pointer 12 which is pivotable at 13 with an end 14 extending beyond the pivot point 13 from a pointer end 15 to substantially balance the pointer 12. It should be noted on the scale 11 that an intermediate section 16, of an intermediate color, such as "amber" or "orange", gives a warning that action will be required in the near future.

A microswitch contact 17 is adjustable in position at a convenient location near a line separating the "amber" portion of the scale 11 from the "red" portion. When the contact 17 is touched by the pointer 12, a circuit is completed to close a microswitch 18.

Before proceeding further, a brief description of the force that is acting on the voltmeter 10 may be helpful. In industry today, there are many instances of the need for contactor devices to control the "on" and "off" status of an electrical voltage. Electric motors must be started and stopped repeatedly, each such cycle causing an arc to be generated, particularly between contactor tips that are being separated while an electric current is flowing.

Figure 2:
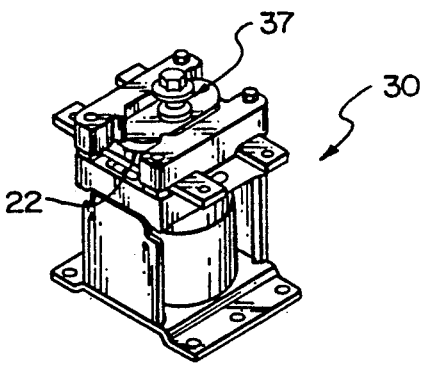
FIG. 2 is a view in perspective of a contactor with tips that become contaminated and must be cleaned by the method of the present invention.

One such electric contactor device is illustrated in FIG. 2 of the drawings, and there are many manufacturers of these devices, such as the General Electric Company, Mitsubishi Denki of Japan and the Matsushita Electric Works, also of Japan. The contactor illustrated in FIG. 2 is for controlling 100 amps in an electric vehicle system.

An electrical contactor opening under a load reduces the life of the contact tips because of the resulting arc developed between the tips. Conversely, cold contact switching, i.e., removing the applied voltage and the electric current flow first, allows an oxidation to build up on the tips, and this also reduces the life of the contactor tips. Such oxidation is from the metal, of which the tips are made, reacting with the air and from environment also.

A contactor could have its tips formed of solid silver, particularly in instances where the contacts are always cold contact switched, and a second set of tips formed of silver cadmium could be substituted for use in those instances when it is known that switching will be under a load. However, this requires two sets of tips, with a resulting increase in cost and a very real danger of a mix-up, since physically they look alike.

The prior art is replete with efforts to develop structures for avoiding the electric arc that develops when tips are separated while carrying an electric current. In an instance involving cold contactor switching, the life of the tips is increased by using solid silver, instead of silver cadmium oxide alloy. The solid silver tip is more expensive, and it is not as strong as a silver cadmium oxide tip. Because it is not as strong, it can not be used in an instance involving switching under a load condition.

In accordance with the method of the present invention, a contactor will use silver cadmium oxide alloy tips in all instances. The contactor tips are cold switched as a regular routine, that is, the voltage, with the resulting high current flow, is removed before the tips are separated.

To maintain the tips in a clean condition, that is, no build up of contamination, periodically at predetermined intervals, the contactor tips are separated under load. This is repeated periodically, depending upon such factors as the environment, the magnitude of the current load and the condition of the tips.

Due to the variables involved in determining a more definite time interval for repeating the above-described tip separation under load for maintaining clean tips, the following procedure will permit the development of a definite schedule or a variation as it may be needed, depending upon the situation of a user.

Referring again to FIG. 1 of the drawings, the voltmeter 10 will function as a sensor of the condition of the tips. Electrically, this is provided by the connections 19 and 20 which connect the actuating coil 21 of the voltmeter 10 to the contactor tips 22. As contamination develops and builds up on the contactor tips 22, the voltage across these tips will rise, thus producing a higher and higher reading (or deflection) of the voltmeter 10 on the scale 11, until the "red" range is reached and the pointer 12 engages the electrical contact 17.

Upon engaging the contact 17, the microswitch 18 applies energizing electric current to an audible buzzer 23 and/or a visible light 24. In an environment where sound is readily heard, the buzzer 23 may be sufficient, but in some working areas, sound may be difficult to hear or discern. In such a situation, the visible light 24 will alert an operator that it is time to actuate the contactor tips 22 under load.

Having been alerted to the need for the above described contactor tip cleaning steps, the operator may record the time interval since the last tip cleaning, and accordingly, based on this information, he can quite readily anticipate very closely when the next tip cleaning procedure should be performed. Of course, it will be recognized that use of the sensor 10 is not essential to the practice of the invention; rather, it is just a convenience. Experience will show that performing the steps of cleaning the contactor tips as described above approximately two or three times in an eight hour period in a regular routine will maintain them in a clean and useful condition, as a general rule.

Therefore, with the sensor 10 as a continuous monitor of the condition of the contactor tips, this is a presently preferred arrangement because of the difficulty and the time required to physically inspect the contactor tips. By observing the voltage across the tips, which is indicated by the position of the pointer 12 on the scale 11, from the use of the sensor 10, and noting an increase in this voltage, the operator is warned of an approaching need for tip cleaning, so that the routine can be timed at his convenience.

Figure 4:
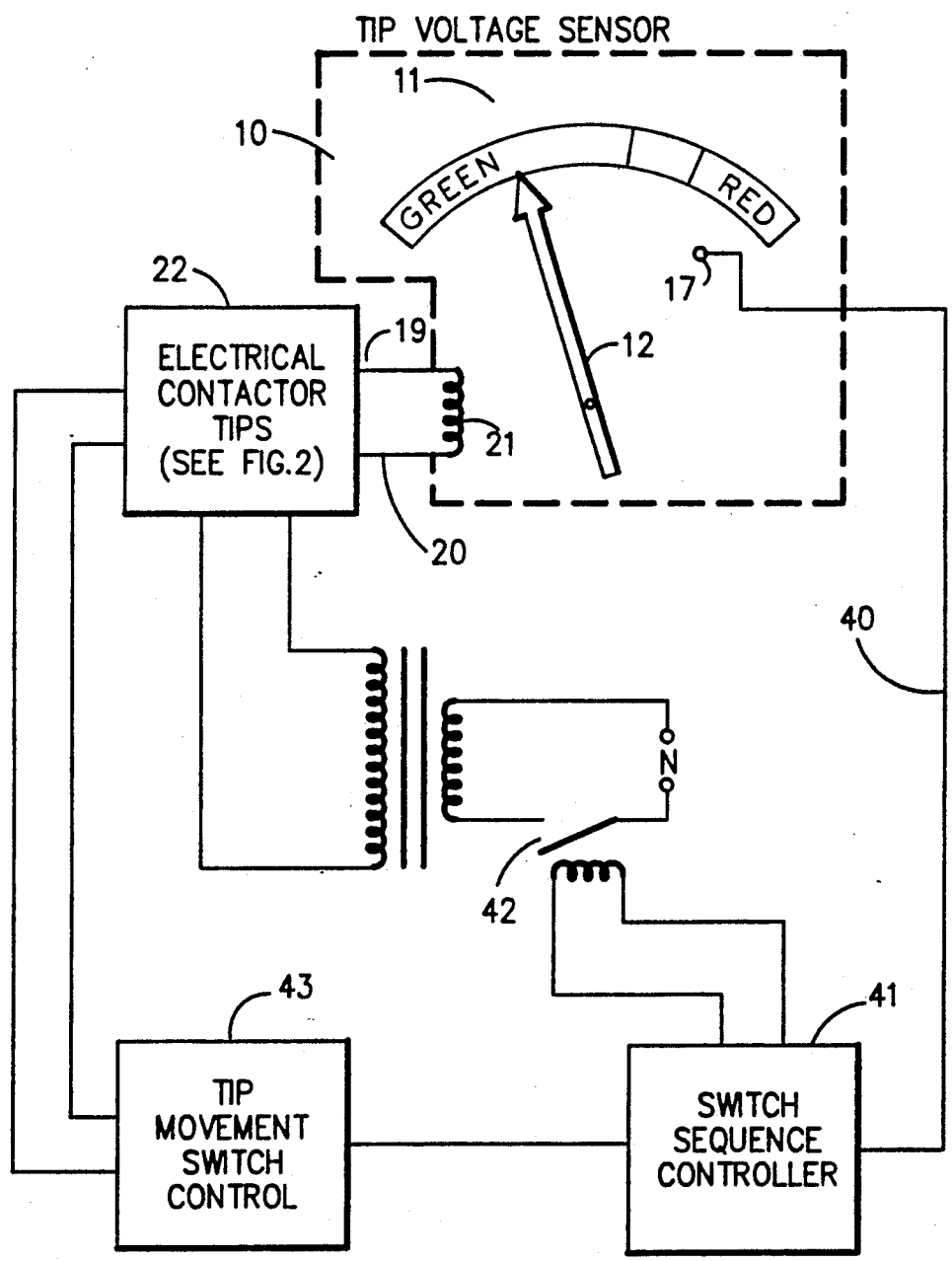
FIG. 4 is a circuit diagram of component parts connected to perform the method of the invention automatically.

Also in accordance with the invention, the method described above can be practiced automatically, which in some operating environments, may be more than just a convenience. Reference is made to FIG. 4 of the drawings in which the same numerals are used to identify the same or comparable parts.

In FIG. voltmeter type sensor 10 is illustrated for consistency only. It will be understood that, particularly in an arrangement for carrying out the method of the invention automatically, the sensor 10 need not be one that gives a visual indication.

Therefore, the sensor 10 gives a signal when the voltage across the contactor tips 22 reaches a selected value, and in the illustrated arrangement, this signal is connected by a line 40 to a switch sequence controller 41, which controls the operation of a primary voltage switch 42 and the opening and closing of the contactor tips 22.

Normal operation of the controller 41 opens the switch 42 before a tip movement switch control circuit 43 is energized to open the contactor tips 22, thereby removing the voltage from the tips 22 before they are separated, which is called a "cold switching" mode. Then, in accordance with this aspect of the present invention, when there is a signal applied to the switch controller 41 over the line 40, the controller 41 now keeps the line switch 42 closed as the tip movement switch control 43 is energized to open the tips 22 under a load condition to clean them as described hereinabove. This procedure is repeated only when the electrical contact 17 causes a signal over the line 40 to the switch sequence controller 41, which according to present experience is approximately two or three times in an eight hour period.

The method of the invention may be used with any of the many types of electrical contactors available commercially on the market today. One is shown in FIG. 2 and is identified by the numeral 30. In this assembled view of the contactor 30, the physical location of the contactor tips 22 is shown for this particular type of contactor device.

Figure 3:
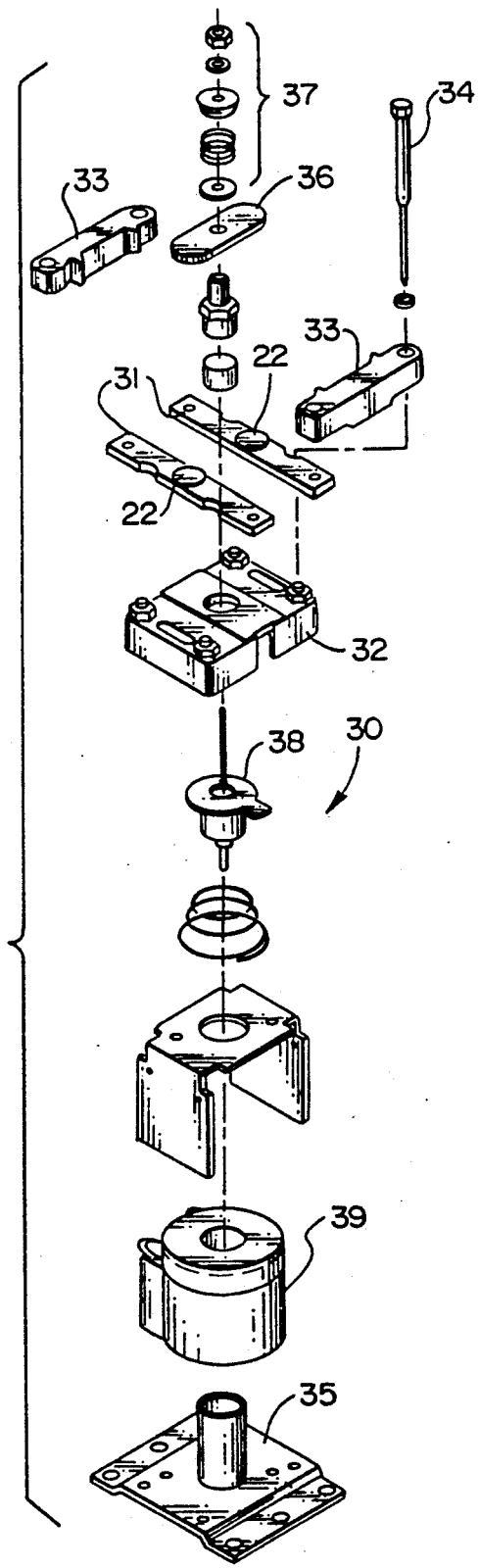
FIG. 3 is an exploded view of the contactor shown assembled in FIG. 2.

To show the location of these tips 22 more specifically, reference is made to the exploded view in FIG. 3 of the drawings. Here, the tips 22 are seen as stationary, in a pair, and they are positioned centrally on each of two electrically conductive strips, identified by the same numeral 31.

The tip strips 31 are positioned on an electrically insulating block 32 and held firmly in place by matching insulating blocks 33 spaced apart near each end of the strips 31. Four long bolts, like the bolt 34, passing through each end of the two blocks 33, through holes near the corners of the larger block 32 and into a base 35 secure this assembly together.

The movable portion of the tips 22 is located on the under side of an electrically conductive strip 36 which is attached by readily recognizable parts 37 to a plunger member 38 that, when a coil 39 is energized, attracts the member 38 with the strip 36 down against the fixed position parts of the tip 22. The electrical connections 19 and 20, FIG. 1, are attached to the ends of the strips 31 to obtain the voltage across the contactor tips 22.

Figure 5:
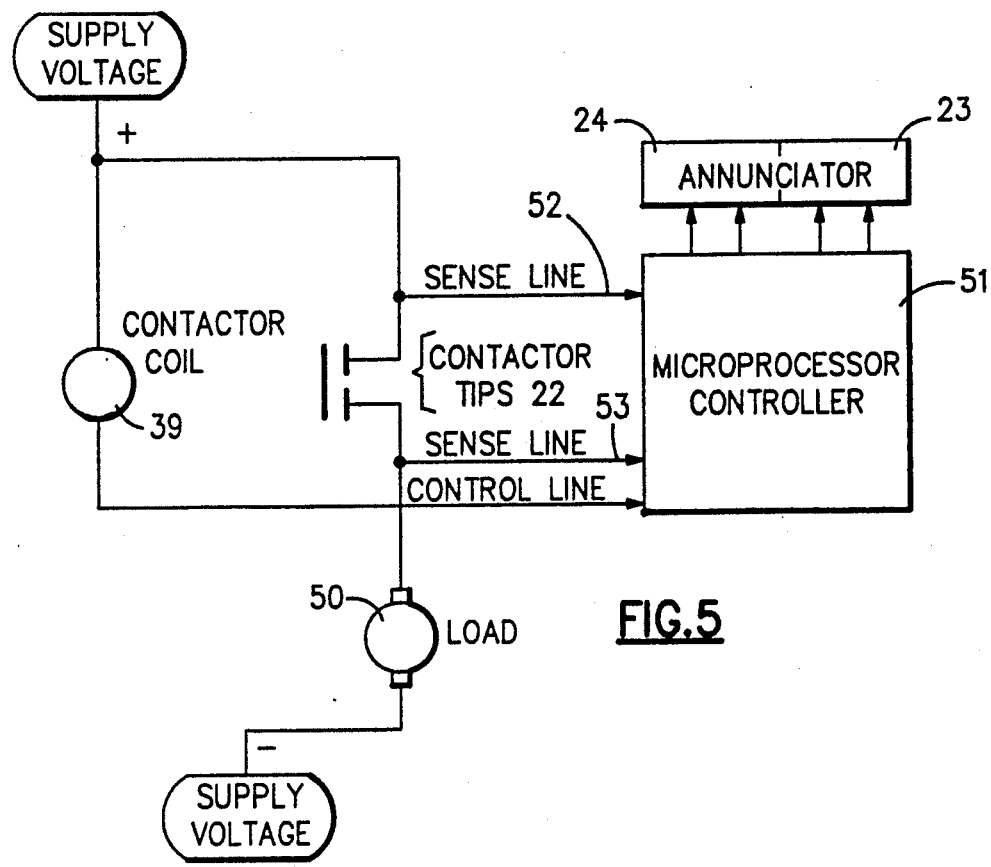
FIG. 5 is a diagrammatic circuit illustrating an alternative embodiment of the present invention in which voltage is monitored.

In FIG. 5, the circuit of FIG. 1 is enhanced by illustrating a load 50 as it relates to the contactor tips 22. The contactor tips are cleaned in this form of the invention under the control of a microprocessor controller 51, such as is manufactured by the Motorola Corporation as model No. MC6811A8.

Two sense connections 52 and 53 permit monitoring the voltage across the contactor tips 22 while they are under load. When this voltage reaches a predetermined magnitude, as described hereinabove, an annunciator, either audible 23 or visual 24, FIG. 1, can be energized.

Figure 6:
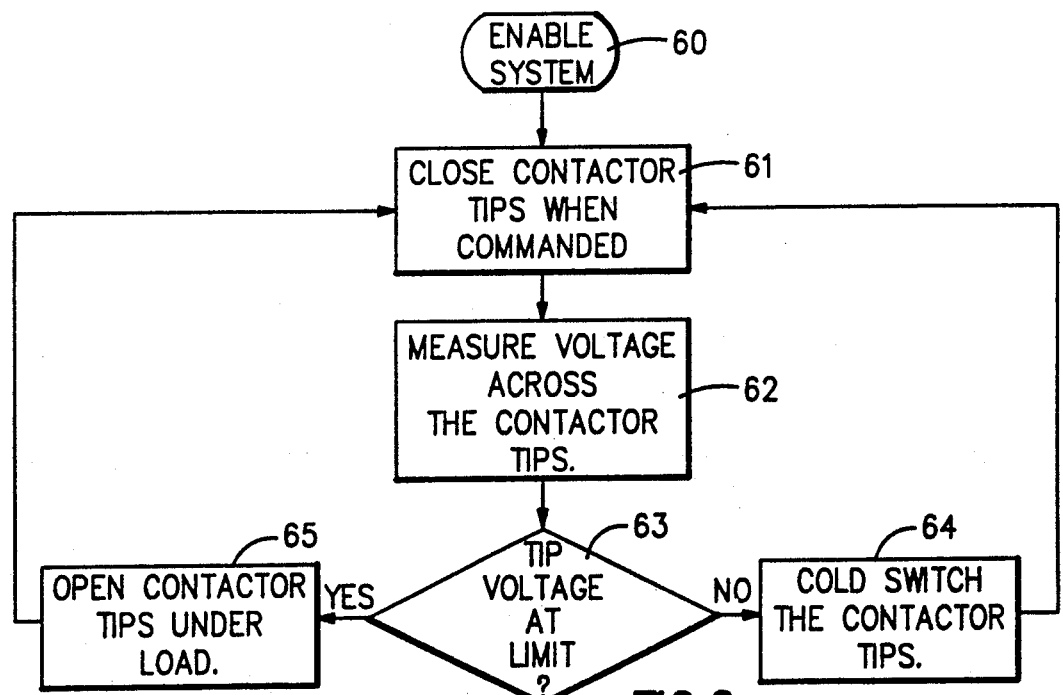
FIG. 6 is a flow chart illustrating aspects of the circuit of FIG. 5.

A flow chart indicating the sequence of steps for successful operation of this circuit is given in FIG. 6.

Referring to FIG. 6, during normal operations, the system is enabled, step 60. The contactor tips 22 (FIG. 1 and FIG. 5) now are closed, step 61.

While the contactor tips 22 are closed and the system in which they are connected is operational, the voltage across the contactor tips is measured, step 62. Normally, the voltage across the contactor tips 22 will not exceed a predetermined limit, which is tested as indicated by numeral 62, and a decision is made, step 63, for opening the contactor tips 22. Under normal operations, the decision made in step 63 is "No", and the contactor tips 22 are opened but only after the applied voltage is removed, step 64.

As described hereinabove, over time and during use, the voltage across the contactor tips 22 increases, and ultimately, the answer to the question raised by step 63 will be "yes". When this occurs, the testing action, 62, will show that the contactor tips 22 now should be opened under a load condition, step 65, to form a controlled arc, according to the invention.

After each of these activities, steps 64 and 65, action is returned to the initial control, step 61. This description gives a complete cycle of operations in accordance with the present invention.

Figure 7:
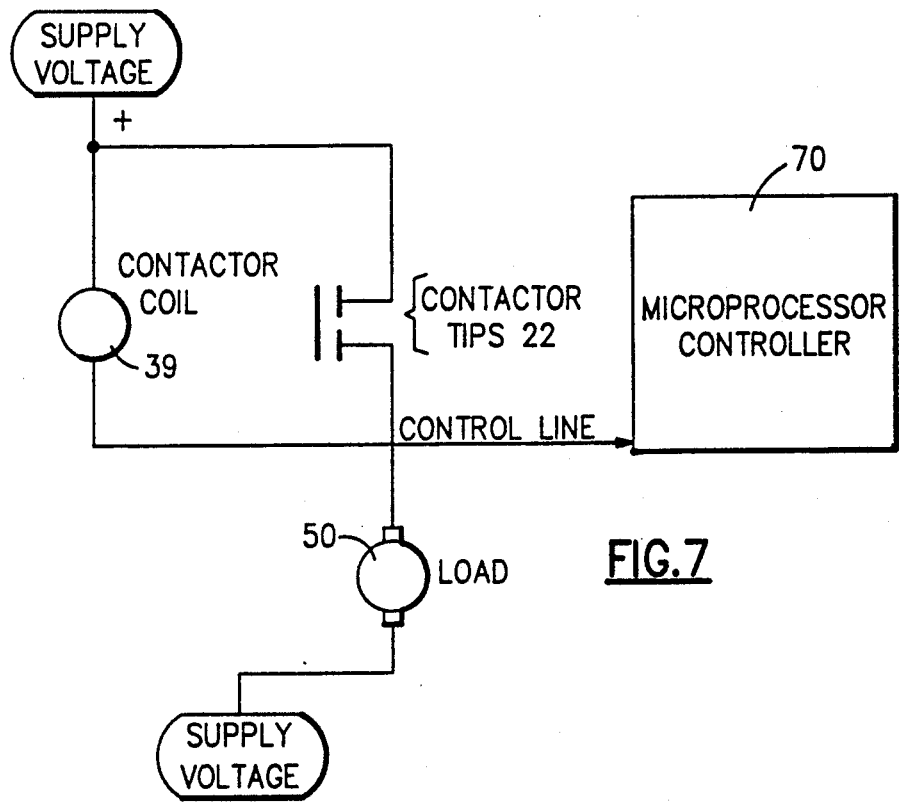
FIG. 7 is a diagrammatic circuit illustrating yet another embodiment of the invention in which time is predetermined.

A modification of the invention is illustrated in FIG. 7. Connections are provided to accomplish tip cleaning without voltage measuring. For example, the contactor tips 22 and the contactor coil to energize them are shown, as in FIG. 5, but there is no need to measure or to sense the voltage across the contactor tips.

An appropriate time interval has been predetermined, and this information is a part of a microprocessor 70, which will time the operation of the contactor tips 22, as will now be described. The microprocessor 70 also can energize a preselected annunciator, if desired, like in FIG. 5.

Figure 8:
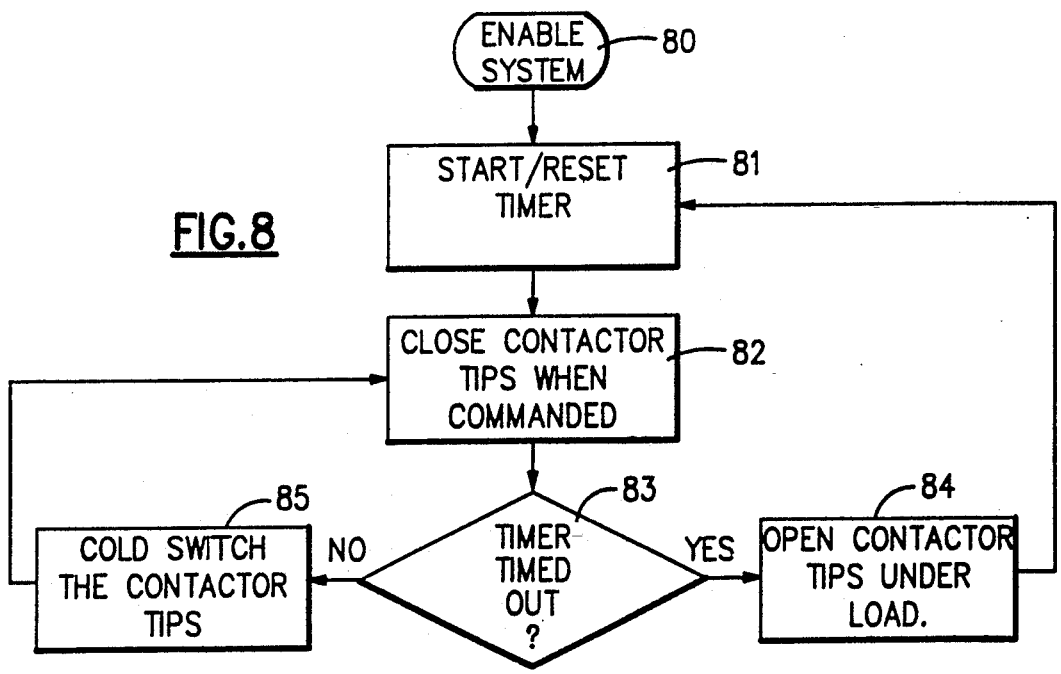
FIG. 8 is a flow chart illustrating aspects of automatic operation according to the circuit of FIG. 7.

FIG. 8 shows this action more graphically by a flow chart beginning with an enable action, step 80. The microprocessor 70, FIG. 7, initiates an internal timer, step 81, to expire in a predetermined time (e.g., two or more hours). The contactor tips 22 then are closed, step 82.

Now, before the contactor tips 22 are opened, a decision is made, step 83, as to whether the time has expired as determined by the timer, step 81. If the answer is "yes", the contactor tips 22 are opened under load, step 84, whereupon processing is returned to step 81 and the timer is reset.

On the other hand, if the predetermined time has not expired and the answer as determined by step 83 is "no", the contactor tips 22 are opened only after the applied voltage is switched off (called "cold switching"), step 85, which provides an arc-less operation. In this instance, no tip cleaning is indicated and none is accomplished. Processing control returns to step 82 without resetting the timer.

While the invention has been shown and described with particular reference to a preferred embodiment, it will be understood by those skilled in the art that various changes and modifications in both form and detail may be made without departing from the true spirit and scope of the invention which is defined by the appended claims.

What is claimed is:

1. A method of maintaining the tips of an electrical contactor device in a clean and operable condition during use, comprising the steps:
   opening said tips during regular working periods in a cold switching mode; and
   at predetermined intervals of time, opening said tips while under a load condition; whereby an electric arc developed when opening said tips while under a load condition maintains said tips in a clean and operable condition substantially free of contamination.

2. The method as defined by claim 1 wherein said predetermined intervals of time are least two hours apart.

3. The method as defined by claim 1 wherein said electrical contactor device includes tips formed of silver cadmium oxide alloy material.

4. A method of maintaining the tips of an electrical contactor device in a clean and operable condition during use at a preselected voltage, comprising the steps:
   opening said tips during regular working periods in a cold switching mode;
   monitoring said voltage during said regular working periods; and
   opening said tips, when said monitored voltage reaches a predetermined value, under a load condition;
   whereby an electric arc developed when opening said tips while under a load condition maintains said tips in a clean and operable condition substantially free of contamination.

5. The method as defined by claim 4 wherein said step of opening said tips while under a load condition is performed automatically when a voltage across said tips reaches a predetermined value.

6. The method as defined by claim 4 wherein said electrical contactor device includes tips formed of silver cadmium oxide alloy material.

7. The method as defined by claim 4 wherein said monitoring step includes listening for an audible sound to indicate that said step of operating said tips under a load is due.

8. The method as defined by claim 4 wherein said monitoring step includes viewing a visual indicator to determine whether said step of operating said tips under a load is due.

9. The method as defined by claim 8 wherein said step of viewing a visual indicator includes viewing a light.

10. The method as defined by claim 8 wherein said step of viewing a visual indicator includes viewing a voltmeter connected to be responsive to a voltage across said tips.

11. A method of maintaining the tips of an electrical contactor device in a clean and operable condition during use at a preselected voltage, comprising the steps:
   opening said tips during regular working periods in a cold switching mode;
   monitoring said voltage during said regular working periods; and
   at predetermined intervals of time, derived from said monitoring step, opening said tips while under a load condition;
   whereby an electric arc developed when opening said tips while under a load condition maintains said tips in a clean and operable condition substantially free of contamination.

12. The method as defined by claim 11 wherein said predetermined intervals of time are at least two hours apart.

13. The method as defined by claim 11 wherein said electrical contactor device includes tips formed of silver cadmium oxide alloy material.

14. The method as defined by claim 11 wherein said monitoring step includes listening for an audible sound to indicate that said step of operating said tips under a load is due.

15. A method as defined by claim 11 wherein said monitoring step includes viewing a visual indicator to determine whether said step of operating said tips under a load is due.

16. A method as defined by claim 15 wherein said step of viewing a visual indicator includes viewing a light.

17. A method as defined by claim 15 wherein said step of viewing a visual indicator includes viewing a voltmeter connected to be responsive to a voltage across said tips.

18. A method as defined by claim 11 wherein said step of opening said tips while under a load is performed automatically at said predetermined time interval.

19. Apparatus for maintaining silver cadmium oxide alloy tips of an electrical contactor device in a clean and operable condition during use, comprising:
   means for opening said tips during regular working periods under a cold switching mode; and
   means for opening said tips at predetermined intervals of time under a load condition;
   whereby an electric arc developed when opening said tips under said load condition maintains said tips in a clean and operable condition substantially free of contamination.

20. Apparatus for maintaining tips as defined by claim 19 including means for sensing the voltage developed across said tips.

21. Apparatus for maintaining tips as defined by claim 19 including means connected with said tips to monitor a voltage developed across said tips during operations, and means connected to be responsive to said voltage for giving an indication when said voltage reaches a predetermined magnitude.

22. Apparatus for maintaining tips as defined by claim 21 wherein said means to monitor a voltage includes audible means.

23. Apparatus for maintaining tips as defined by claim 21 wherein said means to monitor a voltage includes visual means.

24. Apparatus for maintaining tips as defined by claim 21 including means to initiate opening of said tips under load automatically when said voltage reaches said predetermined magnitude.

25. Apparatus for maintaining tips as defined by claim 24 including switch means for controlling an electric current carried by said tips during working conditions, and controller means for assuring said switch means interrupts said electric current before said tips are separated during normal working conditions.

26. Apparatus for maintaining tips as defined by claim 25 wherein said controller means is connected to be responsive to said monitor means.

27. Apparatus for maintaining tips as defined by claim 26 wherein said monitor means is in the form of a voltmeter, including connections for sensing a voltage developed across said tips.

28. Apparatus for maintaining tips as defined by claim 27 wherein said voltmeter includes a scale with markings to indicate by colors status of said tips.

29. Apparatus for maintaining tips as defined by claim 28 wherein said scale includes a warning zone for indicating an approaching automatic operation of said tip cleaning procedure.

30. Apparatus for maintaining tips as defined by claim 24 wherein said means to initiate said operations automatically includes microprocessor means.

31. Apparatus for maintaining tips of an electrical contactor device in a clean and operable condition during use, comprising:
   means for opening said tips during regular working periods under a cold switching mode;
   means connected with said tips to monitor a voltage developed across said tips during said regular working periods;

microprocessor means connected to be responsive to said voltage for giving an indication when said voltage reaches a predetermined magnitude; and means responsive to said microprocessor means to initiate opening of said tips under load when said voltage reaches said predetermined magnitude;

whereby an electric arc developed when opening said tips under said load maintains said tips in a clean and operable condition substantially free of contamination.

32. Apparatus for maintaining tips as defined by claim 31 wherein said means to monitor a voltage includes audible means.

33. Apparatus for maintaining tips as defined by claim 31 wherein said means to monitor a voltage includes visual means.

34. Apparatus for maintaining tips as defined by claim 31 wherein said means responsive to said microprocessor means to initiate said opening of said tips under load is automatic when said voltage reaches said predetermined magnitude.

35. Apparatus for maintaining tips as defined by claim 31 wherein said means to monitor a voltage includes annunciator means, and said means to initiate said opening of said tips under load is automatic when said voltage reaches said predetermined magnitude.

* * * * *